United States Patent
Knapp et al.

(10) Patent No.: US 10,502,004 B2
(45) Date of Patent: Dec. 10, 2019

(54) METAL-TO-METAL SEALED POWER CONNECTION FOR SUBMERSIBLE PUMP MOTOR

(71) Applicant: Baker Hughes, a GE Company, LLC, Houston, TX (US)

(72) Inventors: John Knapp, Claremore, OK (US); Mark L. Bellmyer, Fort Scott, KS (US); James Christopher Clingman, Broken Arrow, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 251 days.

(21) Appl. No.: 15/720,805

(22) Filed: Sep. 29, 2017

(65) Prior Publication Data
US 2018/0094492 A1  Apr. 5, 2018

Related U.S. Application Data
(60) Provisional application No. 62/404,439, filed on Oct. 5, 2016.

(51) Int. Cl.
*H01R 4/60* (2006.01)
*E21B 17/02* (2006.01)
(Continued)

(52) U.S. Cl.
CPC .......... *E21B 17/023* (2013.01); *E21B 17/003* (2013.01); *E21B 17/1035* (2013.01);
(Continued)

(58) Field of Classification Search
CPC ....... H01R 13/52; H01R 13/523; F16L 19/10; F16L 3/00; F16L 3/1016; F16L 3/12; F16L 9/02; F16L 15/04
See application file for complete search history.

(56) References Cited

U.S. PATENT DOCUMENTS 6,409,485 B1   6/2002   Ebner
6,780,037 B1 * 8/2004   Parmeter .............. H01R 13/523
                                                                439/191
(Continued)

FOREIGN PATENT DOCUMENTS

JP       10-054190 A       2/1998
KR  10-2012-0034469 A      4/2012

OTHER PUBLICATIONS

International Search Report and Written Opinion dated Jun. 12, 2018 for corresponding PCT/US2018/014915.

*Primary Examiner* — Xuong M Chung Trans
(74) *Attorney, Agent, or Firm* — Bracewell LLP; James E. Bradley

(57) ABSTRACT

An electrical submersible well pump motor has metal-to-metal sealing for the power cable electrical connection. A conductor passage in the motor head has a conical seat. A motor contact member electrically connected with the motor is located in the conductor passage below the seat. A metal tube has a lower portion that inserts into an upper portion of the conductor passage. A metal sealing ferrule encircles the tube, and a compression nut deforms the ferrule into sealing engagement with the seat and the tube. An electrical conductor extending from the power cable protrudes downward from the tube and has a conductor contact member on a lower end. The motor contact member and the conductor contact member stab into partial engagement with each other, defining a gap between terminal surfaces of the contact members that can close up during operation due to thermal growth.

20 Claims, 6 Drawing Sheets

(51) Int. Cl.
*E21B 17/00* (2006.01)
*E21B 17/10* (2006.01)
*F16L 19/10* (2006.01)
*F04B 1/00* (2006.01)
*F04B 17/03* (2006.01)
*F04B 47/06* (2006.01)
*F04B 53/16* (2006.01)
*H02G 15/16* (2006.01)

(52) U.S. Cl.
CPC ............... *F04B 1/00* (2013.01); *F04B 17/03* (2013.01); *F04B 47/06* (2013.01); *F04B 53/16* (2013.01); *F16L 19/10* (2013.01); *H02G 15/16* (2013.01)

(56) References Cited

U.S. PATENT DOCUMENTS

| | | | |
|---|---|---|---|
| 7,325,596 B2* | 2/2008 | Ebner | E21B 17/028 166/105 |
| 7,575,458 B2* | 8/2009 | Parmeter | H01R 13/521 439/271 |
| 7,666,013 B1* | 2/2010 | Kopecky | F04D 13/10 417/423.3 |
| 8,382,508 B1* | 2/2013 | Frey | H01R 13/5205 439/461 |
| 8,512,074 B2* | 8/2013 | Frey | H01R 13/523 439/279 |
| 9,709,043 B2* | 7/2017 | Gilmore | H02K 5/132 |
| 9,915,266 B2* | 3/2018 | Majors | H02G 3/0675 |
| 2007/0277878 A1 | 12/2007 | Strattan et al. | |
| 2012/0063932 A1 | 3/2012 | Rumbaugh et al. | |

\* cited by examiner

METAL-TO-METAL SEALED POWER CONNECTION FOR SUBMERSIBLE PUMP MOTOR

CROSS REFERENCE TO RELATED APPLICATION

This application claims priority to provisional application Ser. No. 62/404,439, filed Oct. 5, 2016.

FIELD OF INVENTION

The present disclosure relates to downhole pumping systems for well bore fluids. More specifically, the present disclosure relates to a motor power connection that has a metal-to-metal sealing arrangement.

BACKGROUND

Electrical submersible well pumps (ESP) are often used to pump liquids from hydrocarbon producing wells. A typical ESP includes a pump driven by an electrical motor. Production tubing, which comprises pipes having threaded ends secured together, supports the ESP in most installations. The pump normally pumps well fluid into the production tubing. A power cable extends alongside the production tubing to the motor for supplying power.

The power cable may have on a lower end a splice that connects it to a motor lead. The motor lead extends alongside the ESP and has a motor connector or pothead on its lower end that connects to an upper end of the motor to supply power. The motor lead may have three conductors bundled together, one for each phase of power being supplied. Alternately, the motor lead may comprise three separate metal tubes, each containing one of the power conductors, and each having a connector on the lower end.

A variety of motor connectors are known. In many types, the seal arrangement for the power conductors is elastomeric. Metal-to-metal sealing is known generally for downhole electrical devices to have a longer lasting life and the ability to withstand higher temperatures.

SUMMARY

A downhole apparatus for a well includes a downhole device having a conductor passage with a conical seat. The device has a set of threads located above the seat. A device contact member electrically connected with the device is located in the conductor passage below the seat. A hard tube has a lower portion that inserts into an upper portion of the conductor passage. A sealing ferrule encircles the tube. A compression nut deforms the ferrule into sealing engagement with the seat and the tube when secured to the threads. An electrical conductor having a layer of insulation extends through and protrudes downward from the tube. The conductor has a conductor contact member on a lower end of the conductor. The device contact member and the conductor contact member are in stabbing into engagement with each other and having mating terminal surfaces that engage each other when the device contact member and the conductor contact member are fully stabbed into engagement with each other.

In the embodiment shown, the ferrule is secured to the tube and sealed to the seat by the compression nut at a first selected distance from the terminal surface of the conductor contact member. The first selected distance is less than a second selected distance from the terminal surface of the device contact member to the seat. The difference in distance causes the conductor contact member and the device contact member to be only partially stabbed into each other, defining a gap between the terminal surfaces after the lower portion of the tube is fully inserted into the conductor passage and the ferrule sealed to the seat by the compression nut.

The layer of insulation on the conductor may be free of bonding to an inner diameter of the tube. A spacer sleeve surrounds the layer of insulation on the conductor. The spacer sleeve has an upper end that engages a lower end of the tube and a lower end that engages an upper end of the conductor contact member to prevent upward sliding movement of the conductor and the layer of insulation relative to the tube.

A shipping cap may be employed prior to inserting the tube into the conductor passage. The shipping cap has a hole into which the tube and the conductor contact member are inserted. The hole has a shipping cap seat and threads above the shipping cap seat for receiving the compression nut. A depth of the hole from the bottom of the hole to the threads in the shipping cap equals the first selected distance.

In the embodiment shown, an insulator sleeve having an insulator sleeve passage is located in the conductor passage. The insulator sleeve has an upper end below the seat. The conductor along with the layer of insulation extends into the insulator sleeve passage. A lower end of the tube is located above the insulator sleeve.

Also, in the embodiment shown, a downward facing shoulder is in the conductor passage below the seat. The insulator sleeve is a single-piece, rigid member with an upper end that engages the downward facing shoulder in the conductor passage. The device contact member is secured in the insulator sleeve passage to prevent downward movement of the device contact member as the conductor contact member stabs into the device contact member.

In the embodiment shown, the device contact member is secured by employing an internal rib within the insulator sleeve passage. The device contact member has an upper portion that receives the conductor contact member in stabbing engagement and has a lower end that engages an upper side of the rib, preventing downward movement of the device contact member upper portion in the insulator sleeve passage. A device electrical lead extends upward into the insulator sleeve passage and secures to a lower portion of the device contact member below the rib. The device contact member lower portion has a threaded member protruding upward past the rib and secured into threaded engagement with the device contact member upper portion.

In the embodiment shown, the device has a central bore concentric with a longitudinal axis of the device. The conductor passage is offset from the central bore. A guard sleeve inserts into a lower end of the central bore and protrudes downward therefrom. The guard sleeve has an upward facing shoulder that engages a lower end of the insulator sleeve to retain the insulator sleeve in the cable passage.

An optional feature may be employed for testing of the sealing engagement of the ferrule. The optional feature includes an outer diameter seal ring on an outer diameter of the compression nut above the threads that seals the outer diameter of the compression nut to the conductor passage. An inner diameter seal ring on an inner diameter of the compression nut seals an inner diameter of the compression nut to the tube. The outer diameter seal ring, the inner diameter seal ring, and the ferrule define a sealed test chamber in the conductor passage when the compression nut is secured to the threads in the conductor passage and the ferrule sealed to the seat. A test port extends from an exterior of the device to the test chamber to enable testing of the sealing of the ferrule to the seat.

DETAILED DESCRIPTION

Figure 1:
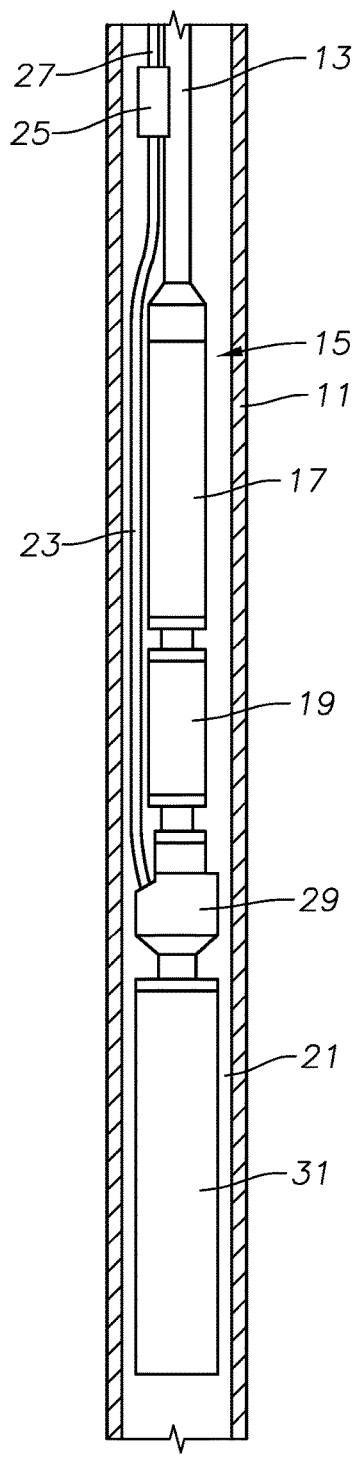
FIG. 1 is a side elevational view of an electrical submersible pump having a motor power connection in accordance with this disclosure.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/− 5% of the cited magnitude. In an embodiment, usage of the term "substantially" includes +/− 5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 shows a well having a casing 11. A string of production tubing 13 extends into casing 11. A downhole device comprising a pump assembly 15 secures to the lower end of tubing 13 for pumping well fluid up tubing 13 to the surface.

Pump assembly 15 has a pump 17 of conventional design. Pump 17 may be a centrifugal pump having a large number of stages, each stage having an impeller and diffuser. Alternately, pump 17 could be another type, such as a progressing cavity pump, a gas compressor or a turbine pump. A lower end of pump 17 couples to a seal section 19 that connects to an electrical motor 21. Seal section 19 may have a movable barrier to equalize the hydrostatic pressure of well fluid in casing 11 with lubricant in motor 21. Alternately, a pressure equalizer could be mounted to a lower end of motor 21. Motor 21 is normally a three-phase AC motor.

A power line comprising an extension lead 23 and a power cable 27 supplies electrical power to motor 21. Extension lead 23 has a lower end that connects to motor 21. A splice 25 joins the upper end of extension lead 23 to power cable 27.

Figure 2:
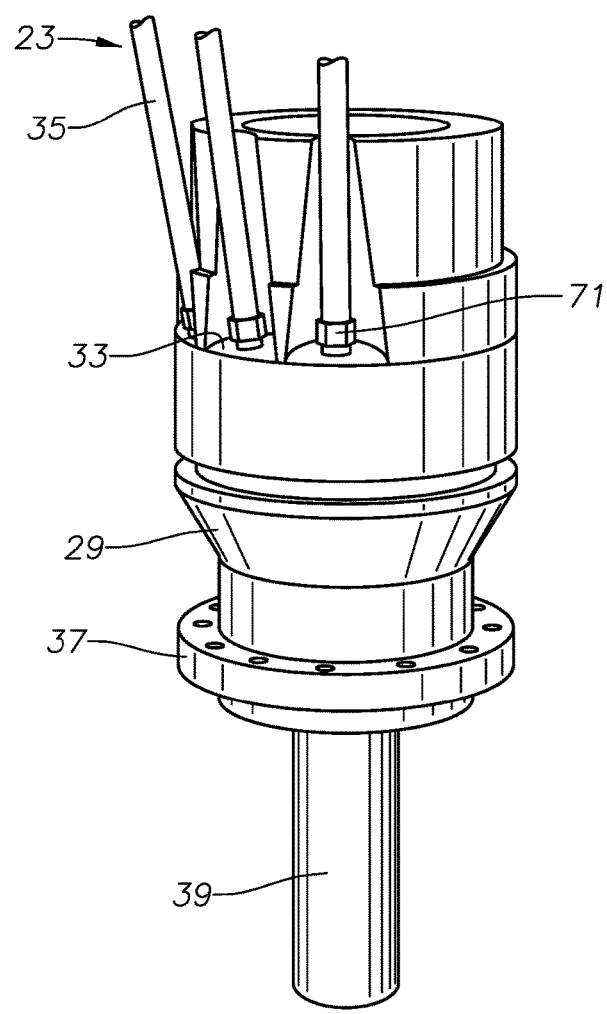
FIG. 2 is a perspective view of the motor head and power connection of FIG. 1, shown removed from the motor.

Motor 21 has a motor head 29 that secures to a tubular motor housing 31. In this example, motor head 29 has one or more notches or recesses 33 on one side for connecting extension lead 23 to motor 21. Referring to FIG. 2, extension lead 23 is made up of three separate metal or hard tubes 35, one for each electrical phase of motor 21. Motor head 29 may have a flange 37 with bolt holes for bolting to the upper end of motor housing 31. Alternately, a threaded arrangement may be used. A guard sleeve or tube 39 protrudes a few inches from the lower end of motor head 29

Figure 3:
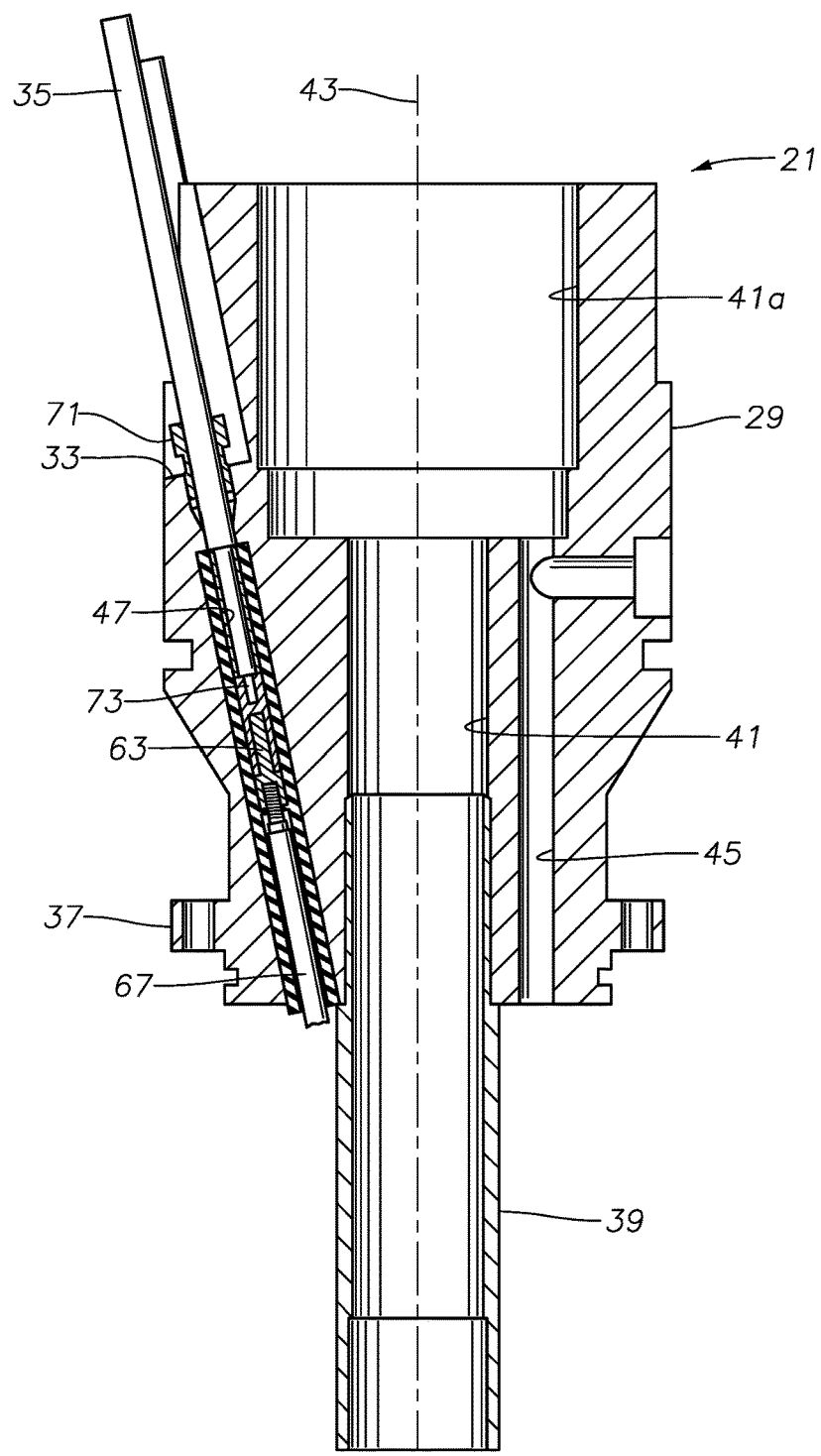
FIG. 3 is a sectional view of the motor head and one of the power connections of FIG. 2.

Referring to FIG. 3, motor head 29 has a central bore 41 through which a rotating drive shaft (not shown) of motor 21 extends. Central bore 41 has a longitudinal axis 43. A thrust bearing (not shown) may be mounted in an enlarged upper portion 41a of bore 41. A lubricant fill port 45 extends from the exterior to a lower end of motor head 29 for filling motor 21 with lubricant. Guard tube 39 has an upper portion that inserts into central bore 41 and is retained by a friction fit.

Figure 4:
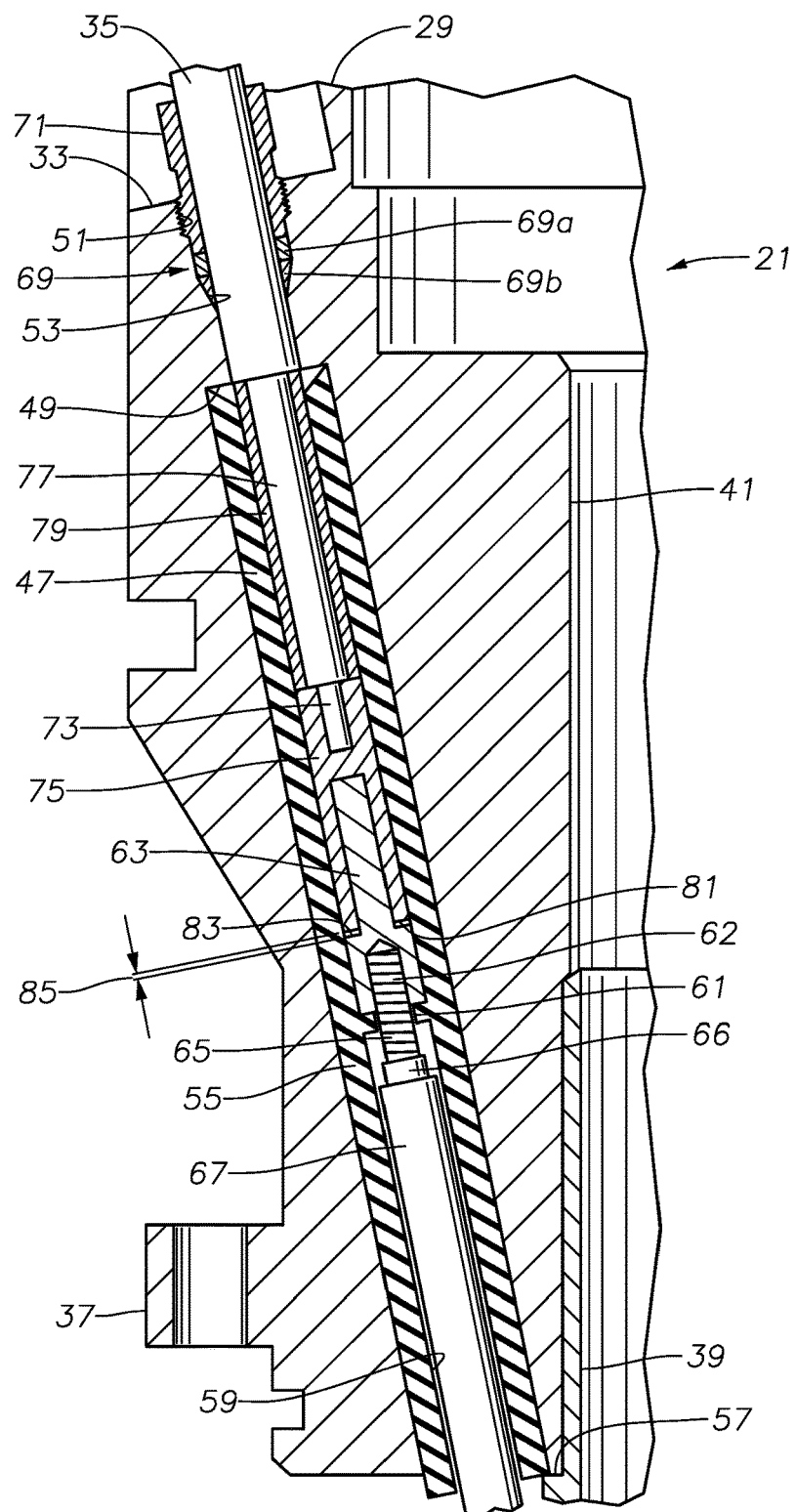
FIG. 4 is an enlarged partial sectional view of the motor head and power connection of FIG. 3.

Referring to FIG. 4, motor head 29 has a cable or conductor passage 47 (only one shown) for each of the motor lead metal tubes 35. Each conductor passage 47 extends from notch 33 to the lower end of motor head 29. In this example, each conductor passage 47 is inclined relative to axis 43 and offset from central bore 41. Each conductor passage 47 has near its upper end a downward facing shoulder 49. Each conductor passage 47 has a set of internal threads 51 in an enlarged portion of conductor passage 47 above downward facing shoulder 49. Each conductor passage 47 has a swage seat 53, typically a conical portion, below internal threads 51 and above downward facing shoulder 49. The lower end of metal tube 35 may be approximately flush with downward facing shoulder 49, which is below swage seat 53.

An electrical insulator sleeve 55 inserts into conductor passage 47 from the lower end. Insulator sleeve 55 is a single-piece rigid member that has an upper end abutting downward facing shoulder 49. The lower end of insulator sleeve 55 may protrude a short distance below the lower end of motor head 29. Insulator sleeve 55 slides freely into conductor passage 47 from the lower end of motor head 29. Guard tube 39 is installed after insulator sleeves 55 and has lower portion larger in diameter than central bore with an upward facing external shoulder 57. Guard Tube shoulder 57 abuts the lower end of each insulator sleeve 55, retaining insulator sleeves 55 in cable passages 47.

Insulator sleeve 55 has an insulator sleeve passage 59 extending through it from its lower end to its upper end. An annular rib 61 may be formed in sleeve passage 59 to provide an upward facing shoulder. Rib 61 has an inner diameter less than the inner diameter of the portions of insulator sleeve passage 59 above and below rib 61.

An electrical motor wire contact member 62 is secured within insulator sleeve passage 59. Motor contact member 62 has an upper portion 63 with a lower end that abuts the upper side of rib 61. The lower end of motor contact member upper portion 63 is larger in diameter than the inner diameter of rib 61, preventing motor contact member upper portion 63 from moving downward in insulator sleeve passage 59 past rib 61.

Motor contact member 62 also as a lower portion 65. Motor contact member lower portion 65 protrudes upward through the inner diameter of rib 61 and secures to motor contact member upper portion 63. In this example, the upward protruding part of lower portion 65 is threaded and secures to threads in a receptacle in the lower end of motor contact member upper portion 63. Motor contact member lower portion 65 has a socket 66 on its lower end that secures to an insulated motor lead 67, such as by crimping.

Motor lead 67 extends downward from motor contact member lower portion 65 and is wound through or connected to a motor wire that winds through the stator (not shown) of motor 21 (FIG. 1). Guard tube 39 prevents motor lead 67 from coming into contact with the rotational drive shaft (not shown). Motor lead 67 may have a larger diameter than the inner diameter of rib 61. In the example shown, socket 66 is not abutting the lower side of rib 61, but is spaced a short distance below.

During assembly, motor lead 67 is crimped to socket 66 and inserted into conductor passage 47 from the lower end. The threaded end of motor contact member lower portion 65 is inserted upward through the inner diameter of rib 61. Motor contact member upper portion 63 is inserted downward into conductor passage 47 from the upper end and rotated to secure it to motor contact member lower portion 65 with the lower end of motor contact member upper portion 63 engaging the upper side of rib 61.

A sealing ferrule 69 encircles metal tube 35 for sealing metal tube 35 to swage seat 53. Ferrule 69 may be a variety of types, and in this embodiment, it includes a metal flat disk 69a located on top of a metal conical member 69b. A compression nut 71 has a lower end that abuts ferrule 69. Compression nut 71 has external threads that engage conductor passage internal threads 51. After ferrule 69 is located within swage seat 53, tightening compression nut 71 deforms ferrule 69, forming a metal-to-metal seal between swage seat 53 and metal tube 35. The lower end of conductor passage 47 is not sealed and is open to the entry of dielectric lubricant contained in motor 21.

A motor lead conductor 73 located in metal tube 35 has an electrical conductor contact member 75 on its lower end. A lower portion of conductor 73 protrudes downward from the lower end of metal rube 35. A conductor electrical contact member 75 secures to a lower end of conductor 73 and is spaced below the lower end of metal tube 35. Conductor 73 has an external insulation layer 77 that is not bonded to the inner diameter of metal tube 35 in this example. Thus, without other provisions explained below, motor lead conductor 73 and its insulation layer 77 could move up and down a short distance in metal tube 35. Conductor contact member 75 is illustrated as a female type that slides over the pin of motor contact member 63. Alternately, conductor contact member 75 could be a pin and motor contact member 63 a female type.

A spacer sleeve 79 encloses insulation layer 77 and fits within insulator sleeve passage 59. Spacer sleeve 79 has an upper end that abuts the lower end of metal tube 35 and a lower end that abuts the upper end of conductor contact member 75. Spacer sleeve 79 prevents conductor contact member 75 from sliding up any closer to metal tube 59. Spacer sleeve 79 thus prevents conductor 73 from sliding upward within metal tube 35. Spacer sleeve 79 may be formed of an electrical insulation material.

Conductor contact member 75 has a downward facing shoulder or terminal surface 81 that can abut an upward facing shoulder or terminal surface 83 on motor contact member upper portion 63 if pressed against each other with sufficient force. However, as explained below, preferably a gap 85 exists between terminal surfaces 81, 83 when ferrule 69 is fully set and prior to operation of motor 21. Gap 85 may vary, and in one embodiment, it is between 0.050 inch and 0.100 inch. As motor 21 heats up during operation, different coefficients of expansions may cause gap 85 to decease or even close up entirely. In this example, terminal surface 81 is the lower end of conductor contact member 75. Terminal surface 83 is an annular upward facing shoulder surrounding the base of the pin of motor contact member upper portion 63. Terminal surfaces 81, 83 located in other places on contact members 63, 75 are feasible.

Figure 5:
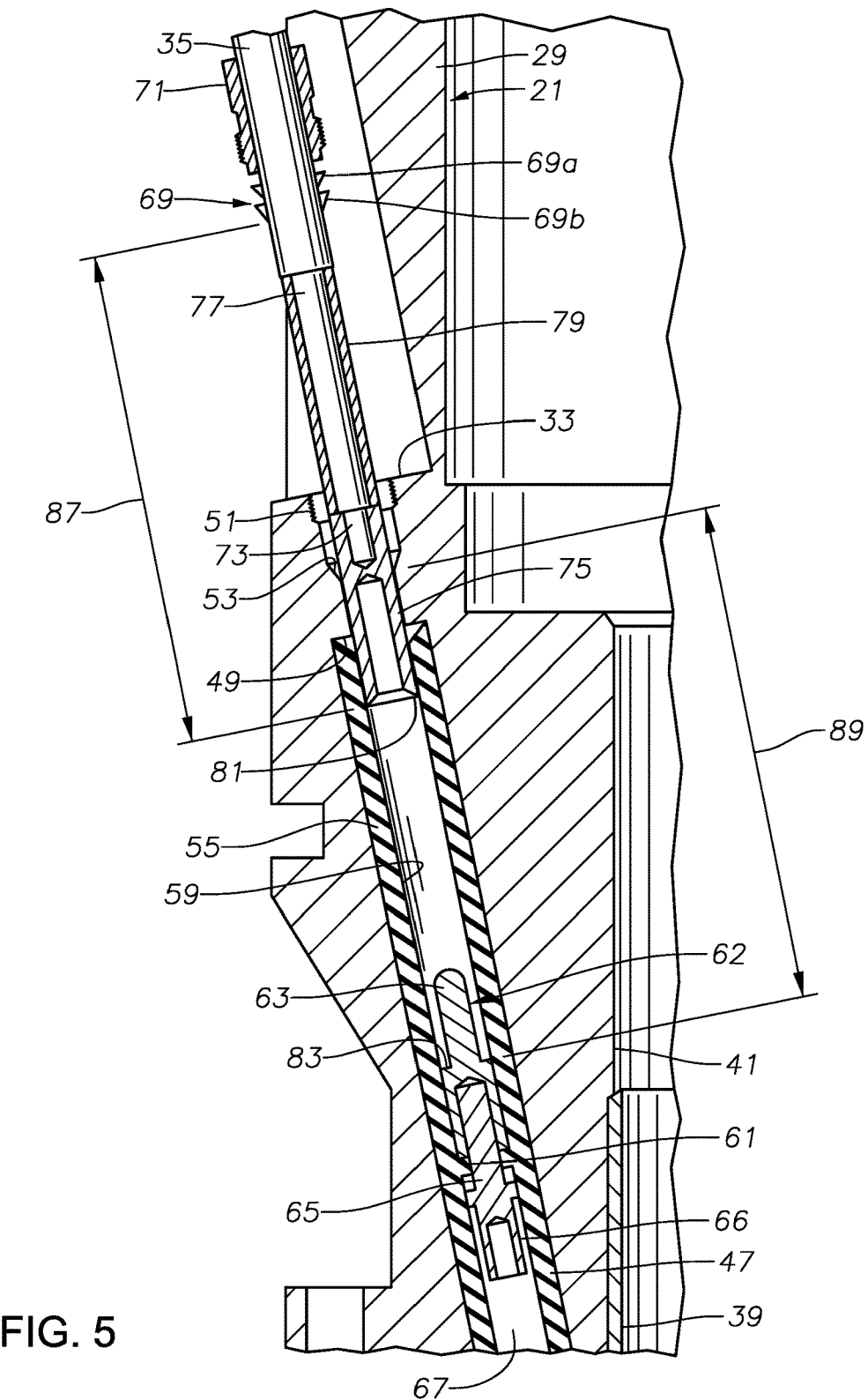
FIG. 5 is a further enlarged sectional view of the motor head and power connection of FIG. 4, showing a motor lead contact member being inserted into a cable passage containing a motor wire contact member, and prior to engagement.

FIG. 5 shows metal tube 35 partially inserted into conductor passage 47, which occurs at a well site when metal tube 35 is being made up with motor head 29. While at a factory and prior to transporting to a well site, ferrule 69 will be secured on metal tube 35 at a fixed distance 87 from motor lead contact terminal surface 81. The securing step may be performed by using a fixture (not shown) at the factory to partly deform or preset ferrule 69 by tightening compression nut 71. The partial deformation causes ferrule 69 to grip metal tube 35 while at the factory, but does not fully deform ferrule 69. Distance 87 is slightly less than a distance 89 from swage seat 53 to motor contact member terminal surface 83. The difference between distances 87 and 89 may be in the range from 0.050 inch to 0.100 inch. Spacer sleeve 79 prevents distance 87 from decreasing once ferrule 79 is preset on metal rube 35.

Figure 6:
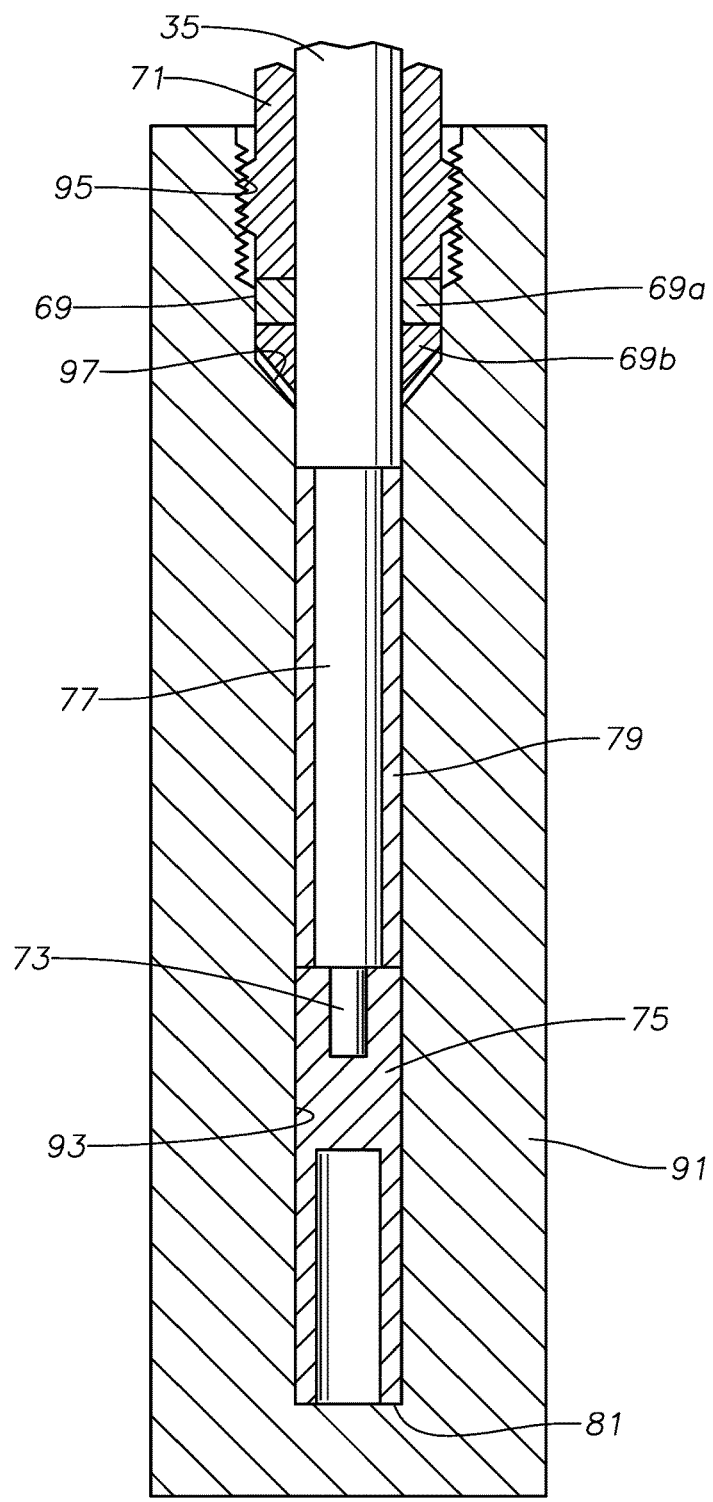
FIG. 6 is a sectional view of a shipping cap with one of the motor lead contact members installed.

A shipping cap 91, shown in FIG. 6, may be used to prevent distance 87 from increasing during transport from the factory to the well site. Without shipping cap 91 or a similar functioning device, conductor 73 could slide outward from metal tube 35, causing distance 87 to increase. Shipping cap 91 has a hole 93 (only one shown) for each conductor 73 and conductor contact member 75. Hole 93 may have threads 95 in an upper end 97 to temporarily fasten compression nut 71 during transport. The upper end 97 of hole 93 has sufficient clearances so that temporarily tightening compression nut 71 to threads 95 will not cause any more deformation of ferrule 69. The depth of hole 93 is selected to substantially equal distance 87 (FIG. 5). Terminal surface 81 may be touching the bottom of hole 93 once compression nut 71 is secured.

At the well site, a technician unscrews compression nut 71 from threads 95 and withdraws motor lead contact member 75. The technician then inserts conductor contact member 75 into conductor passage 47. The technician will feel conductor contact member 75 engaging motor contact member 63 as he pushes metal tube 35 downward. Ferrule 69 will contact swage seat 53 while terminal surface 81 is spaced above terminal surface 83 by gap 85 (FIG. 4). The technician then tightens compression nut 71, which permanently deforms ferrule 69 against swage seat 53. Gap 85 (FIG. 4) between terminal surfaces 81, 83 will continue to exist after ferrule 69 has been fully set.

Pump 17 (FIG. 1) and motor 21 will be lowered into the well and operated by supplying power to power cable 27 (FIG. 1). The only potential leak path of well fluid into conductor passage 47 will be at the metal-to-metal seal created by ferrule 69.

Figure 7:
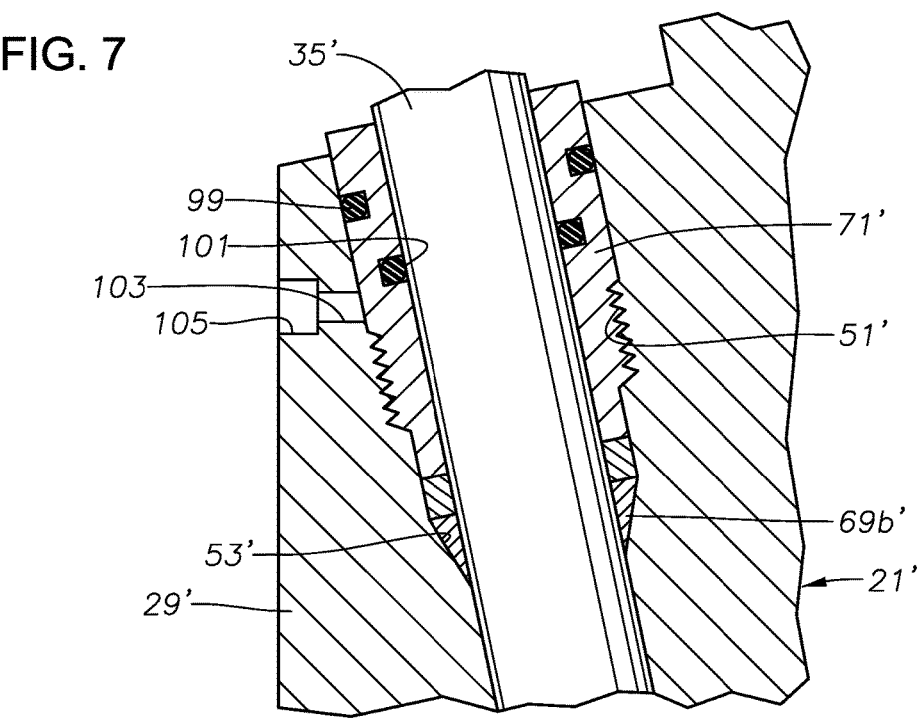
FIG. 7 is an axial sectional view of an upper portion of an alternate embodiment of a motor head and power connection.

FIG. 7 illustrates an alternate embodiment with components similar or the same as in the first embodiment having the same reference numeral, but with a prime symbol. Compression nut 71' has an outer diameter seal ring 99 on its outer diameter above conductor passage threads 51'. Compression nut 71' has an inner diameter seal ring 101 on its inner diameter. Inner diameter seal ring 101 is illustrated as being below outer diameter seal ring 99, but it could be above. A test port 103 extends from the exterior of head 29' to conductor passage 47'. The junction of test port 103 is illustrated as being above conductor passage threads 47', but it could be below as long as it is above swage seat 53' and the sealing portion 69b' of ferrule 69'. A receptacle 105 is located at the outer end of test port 103 for receiving a fitting for applying test pressure and afterward a plug (not shown).

Outer and inner diameter seal rings 99, 101 define a closed test chamber 106 in conjunction with ferrule sealing portion 69b. Test chamber 106 includes the small outer annular clearance between the outer diameter of compression nut 71' and the inner diameter of conductor passage 47', including threads 51'. Test chamber 106 also includes the smaller annular clearance between the inner diameter of compression nut 71' and the outer diameter of metal tube 35'. The lower ends of the outer annular clearance and the inner annular clearance are defined by ferrule sealing portion 69b. The upper end of the outer annular clearance is defined by outer diameter seal ring 99. The upper end of the inner annular clearance is defined by inner diameter seal ring 101.

Applying hydraulic test pressure to test chamber 106 through test port 103 may be performed to determine whether the metal-to-metal seal formed by ferrule sealing portion 69b is leaking. Seal rings 99, 101 are elastomeric, but are only used for testing of ferrule sealing portion 69b. If either seal ring 99, 101 leaks after installation of motor 21', the leakage will not affect the operation.

Figure 8:
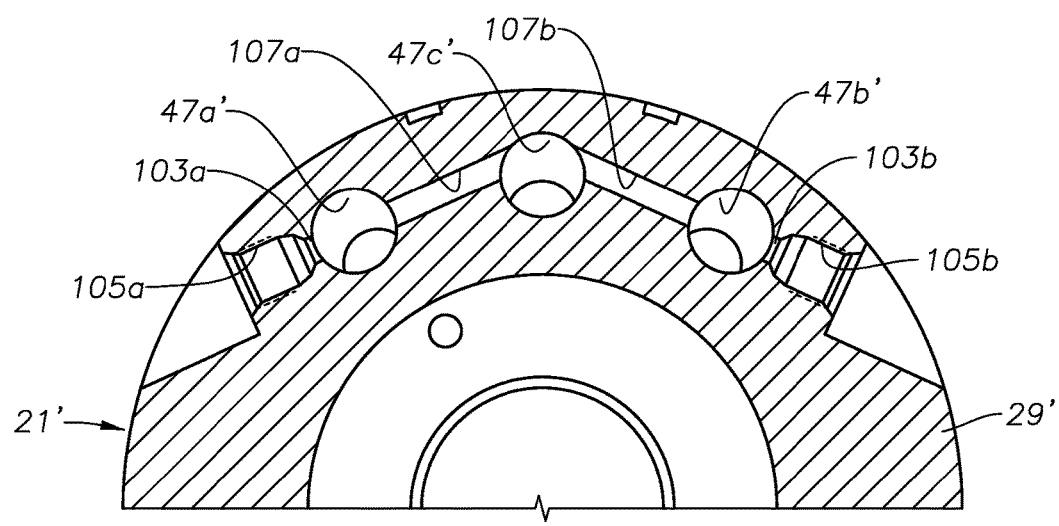
FIG. 8 is a transverse sectional view of the motor head of the alternate embodiment, with the power connections removed.

FIG. 8 shows head 29' in a transverse cross-section without metal tubes 35. Separate test ports 103a and 103b extend to only two of the conductor passages 47a' and 47b', respectively. There is no separate test port 103 in this example for the third conductor passage 47c'. Rather, a communication passage 107a extends from the sealed test chamber 106 (FIG. 7) in to the sealed test chamber 106 in conductor passage 47c'. Another communication passage 107b may extend from the sealed test chamber 106 in conductor passage 47b' to the sealed test chamber 106 in conductor passage 47c'.

A plug (not shown) could be secured in receptacle 105a while a hydraulic test fitting is secured in receptacle 105b, or vice-versa. Applying test pressure to receptacle 105b would result in test pressure being simultaneously applied to all of the test chambers 106 in conductor passages 47a', 47b' and 47c'.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims. For example, the electrical connector arrangement could be employed in downhole electrical devices other than motors for submersible pumps.

The invention claimed is:

1. A downhole device for a well, comprising:
    a conductor passage in the device having a conical seat, the device having a set of threads located above the seat;
    a device contact member electrically connected with the device and located in the conductor passage below the seat;
    a hard tube having a lower portion that inserts into an upper portion of the conductor passage;
    a sealing ferrule encircling the tube;
    a compression nut that deforms the ferrule into sealing engagement with the seat and the tube when secured to the threads;
    an electrical conductor having a layer of insulation, the conductor and the layer of insulation extending through and protruding downward from the tube, the conductor having a conductor contact member on a lower end of the conductor;
    the device contact member and the conductor contact member stabbing into engagement with each other and having mating terminal surfaces that engage each other when the device contact member and the conductor contact member are fully stabbed into engagement with each other; and
    the ferrule being secured to the tube and sealed to the seat by the compression nut at a first selected distance from the terminal surface of the conductor contact member, the first selected distance being less than a second selected distance from the terminal surface of the device contact member to the seat, causing the conductor contact member and the device contact member to be only partially stabbed into each other and defining a gap between the terminal surfaces after the lower portion of the tube is fully inserted into the conductor passage and the ferrule sealed to the seat by the compression nut.

2. The device according to claim 1, wherein:
    the layer of insulation on the conductor is free of bonding to an inner diameter of the tube.

3. The device according to claim 1, further comprising:
    a spacer sleeve surrounding the layer of insulation on the conductor, the spacer sleeve having an upper end that engages a lower end of the tube and a lower end that engages an upper end of the conductor contact member to prevent upward sliding movement of the conductor and the layer of insulation relative to the tube.

4. The device according to claim 1, further comprising:
    a shipping cap employed prior to inserting the tube into the conductor passage, the shipping cap having a hole into which the tube and the conductor contact member are inserted, the hole having a shipping cap counterbore with threads above the shipping cap seat for receiving the compression nut; and wherein
    a depth of the hole from the bottom of the hole to the threads in the shipping cap equals the first selected distance.

5. The device according to claim 1, further comprising:
    an insulator sleeve in the conductor passage and having an insulator sleeve passage, the insulator sleeve having an upper end below the seat; wherein
    the conductor along with the layer of insulation extends into the insulator sleeve passage; and
    a lower end of the tube is located above the insulator sleeve.

6. The device according to claim 1, further comprising:
    a downward facing shoulder in the conductor passage below the seat;
    a single-piece, rigid insulator sleeve in the conductor passage, the insulator sleeve having an upper end that engages the downward facing shoulder in the conductor passage;
    the insulator sleeve having an insulator sleeve passage into which the conductor, the layer of insulation and the conductor contact member are inserted; and wherein the device contact member is secured in the insulator sleeve passage to prevent downward movement of the device contact member as the conductor contact member stabs into the device contact member.

7. The device according to claim 1, further comprising:
a rigid insulator sleeve in the conductor passage that has an upper end below the seat, the insulator sleeve having an insulator sleeve passage;
an internal rib within the insulator sleeve passage; and wherein the device contact member comprises:
a device contact member upper portion that receives the conductor contact member in stabbing engagement, the device contact member upper portion having a lower end that engages an upper side of the rib, preventing downward movement of the device contact member upper portion in the insulator sleeve passage;
a device electrical lead extending upward into the insulator sleeve passage; and
a device contact member lower portion secured to the device electrical lead below the rib, the device contact member lower portion having a threaded member protruding upward past the rib and secured into threaded engagement with the device contact member upper portion.

8. The device according to claim 1, wherein:
the device has a central bore concentric with a longitudinal axis of the device;
the conductor passage is offset from the central bore; and wherein the device further comprises:
an insulator sleeve in the conductor passage, the insulator sleeve having an insulator sleeve passage in which the device contact member and the conductor contact member are located; and
a guard sleeve inserted into a lower end of the central bore and protruding downward therefrom, the guard sleeve having an upward facing shoulder that engages a lower end of the insulator sleeve to retain the insulator sleeve in the cable passage.

9. The device according to claim 1, further comprising:
an outer diameter seal ring on an outer diameter of the compression nut above the threads that seals the outer diameter of the compression nut to the conductor passage;
an inner diameter seal ring on an inner diameter of the compression nut that seals an inner diameter of the compression nut to the tube;
the outer diameter seal ring, the inner diameter seal ring and the ferrule defining a sealed test chamber in the conductor passage when the compression nut is secured to the threads in the conductor passage and the ferrule sealed to the seat; and
a test port extending from an exterior of the device to the test chamber to enable testing of the sealing of the ferrule to the seat.

10. An apparatus for placement within a well, comprising:
a motor having a head;
at least one conductor passage in the head, the conductor passage having a conical seat;
a motor electrical lead extending upward into a lower end of the conductor passage;
a motor contact member electrically connected with the motor lead and located in the conductor passage below the seat, the motor contact member having an upward facing terminal surface;
a power lead extending to the head for supplying power to the motor, the power lead comprising:
a hard tube having a lower portion that inserts into an upper portion of the conductor passage, the tube having a lower end below the seat;
a sealing ferrule encircling the tube;
a compression nut encircling the tube and engaging threads on the head, the compression nut having a lower end in engagement with the ferrule and deforming the ferrule into sealing engagement with the tube and the seat;
an electrical conductor having a layer of insulation within the tube, the electrical conductor and layer of insulation having a protruding portion extending downward past the lower end of the tube;
a conductor contact member on a lower end of the conductor and in partial stabbing engagement with the motor contact member, the conductor contact member having a downward facing terminal surface spaced from the terminal surface of the motor contact member by a gap; and
the gap enabling the conductor contact member and the motor contact member to move toward each other into full stabbing engagement with each other, eliminating the gap, in response to thermal growth during operation of the motor.

11. The apparatus according to claim 10, wherein:
the layer of insulation on the conductor is free of bonding to an inner diameter of the tube; and the apparatus further comprises:
a spacer sleeve surrounding the protruding portion of the layer of insulation, the spacer sleeve having an upper end that engages the lower end of the tube and a lower end that engages an upper end of the conductor contact member, to prevent upward sliding movement of the protruding portion of the conductor and the layer of insulation into the tube.

12. The apparatus according to claim 10, further comprising:
a downward facing shoulder in the conductor passage below the seat;
a single-piece, rigid insulator sleeve in the conductor passage, the insulator sleeve having an upper end that engages the downward facing shoulder in the conductor passage;
the insulator sleeve having an insulator sleeve passage into which the protruding portion of the conductor, the layer of insulation, and the conductor contact member are inserted; and wherein
the motor contact member is secured in the insulator sleeve passage to prevent downward movement of the motor contact member as the conductor contact member stabs into the motor contact member.

13. The apparatus according to claim 10, further comprising:
a rigid insulator sleeve in the conductor passage that has an upper end below the seat, the insulator sleeve having an insulator sleeve passage;
an internal annular rib within the insulator sleeve passage; wherein the motor contact member comprises:
a motor contact member upper portion that receives the conductor contact member in stabbing engagement, the motor contact member upper portion having a lower end that engages an upper side of the rib, preventing downward movement of the motor contact member upper portion in the insulator sleeve passage; and
a motor contact member lower portion secured to the motor electrical lead below the rib, the motor contact member lower portion having a threaded member protruding through an inner diameter of the rib and secured into threaded engagement with the motor contact member upper portion.

14. The apparatus according to claim 10, further comprising:
a central bore within the head;
the conductor passage being offset from the central bore;
an insulator sleeve in the conductor passage, the insulator sleeve having an insulator sleeve passage in which the motor contact member and the conductor contact member are located; and
a guard sleeve inserted into a lower end of the central bore and protruding downward therefrom, the guard sleeve having an upward facing shoulder that engages a lower end of the insulator sleeve to retain the insulator sleeve in the cable passage.

15. The apparatus according to claim 10, further comprising:
an outer diameter seal ring on an outer diameter of the compression nut that seals the outer diameter of the compression nut to the conductor passage;
an inner diameter seal ring on an inner diameter of the compression nut that seals an inner diameter of the compression nut to the tube;
the outer diameter seal ring, the inner diameter seal ring and the ferrule defining a sealed test chamber in the conductor passage when the compression nut is secured to the threads and the ferrule sealed to the seat; and
a test port extending from an exterior of the head to the test chamber to enable testing of the sealing of the ferrule to the seat.

16. An apparatus for placement within a well, comprising:
a motor having a head with a central bore having a longitudinal axis;
at least one conductor passage in the head, the conductor passage inclining toward the central bore in a downward direction, the conductor passage having a conical seat located below a set of threads and a downward facing shoulder in the conductor passage below the seat;
a rigid insulator sleeve located in the conductor passage, the insulator sleeve having an upper end in engagement with the downward facing shoulder, the insulator sleeve having an insulator sleeve passage extending therethrough;
a guard sleeve inserted into the central bore and having a lower portion that extends downward from the central bore and has a larger outer diameter than the central bore;
an upward facing shoulder on the lower portion of the guard sleeve that engages a lower end of the insulator sleeve to retain the insulator sleeve in the conductor passage;
a motor electrical lead extending into a lower portion of the insulator sleeve passage;
a motor contact member electrically connected with the motor lead and located in the insulator sleeve passage, the motor contact member having an upward facing terminal surface;
a power lead extending to the head for supplying power to the motor, the power lead comprising:
a hard tube having a lower portion that inserts into an upper portion of the conductor passage, the tube having a lower end below the seat;
a sealing ferrule encircling the tube;
a compression nut encircling the tube and engaging the threads in the conductor passage, the compression nut having a lower end in engagement with the ferrule that deforms the ferrule into sealing engagement with the tube and the seat;
an insulated electrical conductor having a protruding portion extending downward past the lower end of the tube; and
a conductor contact member on a lower end of the conductor in stabbing engagement with the motor contact member.

17. The apparatus according to claim 16, wherein:
the conductor is free of bonding to an inner diameter of the tube; and the apparatus further comprises:
a spacer sleeve surrounding the protruding portion of the conductor, the spacer sleeve having an upper end that engages the lower end of the tube and a lower end that engages an upper end of the conductor contact member, to prevent upward sliding movement of the protruding portion of the conductor into the tube.

18. The apparatus according to claim 16, further comprising:
an outer diameter seal ring on an outer diameter of the compression nut that seals the outer diameter of the compression nut to the conductor passage;
an inner diameter seal ring on an inner diameter of the compression nut that seals an inner diameter of the compression nut to the tube;
the outer diameter seal ring, the inner diameter seal ring and the ferrule defining a sealed test chamber in the conductor passage when the compression nut is secured to the threads and the ferrule sealed to the seat; and
a test port extending from an exterior of the head to the test chamber to enable testing of the sealing of the ferrule to the seat.

19. The apparatus according to claim 18, wherein:
said at least one conductor passage comprises three conductor passages;
the test chamber comprises three separate test chambers, one for each of the conductor passages; and the apparatus further comprises:
communication passages connecting the three sealed test chambers together, so that test pressure applied to the test port tests all three of the sealed test chambers at the same time.

20. The apparatus according to claim 16, further comprising:
an internal annular rib within the insulator sleeve passage; wherein the motor contact member comprises:
a motor contact member upper portion that receives the conductor contact member in stabbing engagement, the motor contact member upper portion having a lower end that engages an upper side of the rib, preventing downward movement of the motor contact member upper portion in the insulator sleeve passage; and
a motor contact member lower portion secured to the motor electrical lead below the rib, the motor contact member lower portion having a threaded member protruding upward through an inner diameter of the rib and secured into threaded engagement with the motor contact member upper portion.

* * * * *